W. KELSO.
COUPLING AND YOKE CONNECTION.
APPLICATION FILED JUNE 4, 1920
1,399,563.
Patented Dec. 6, 1921.
2 SHEETS—SHEET 1.
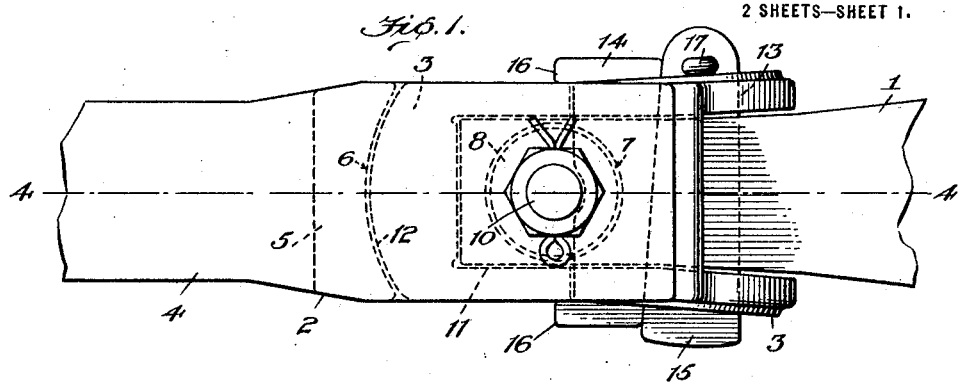
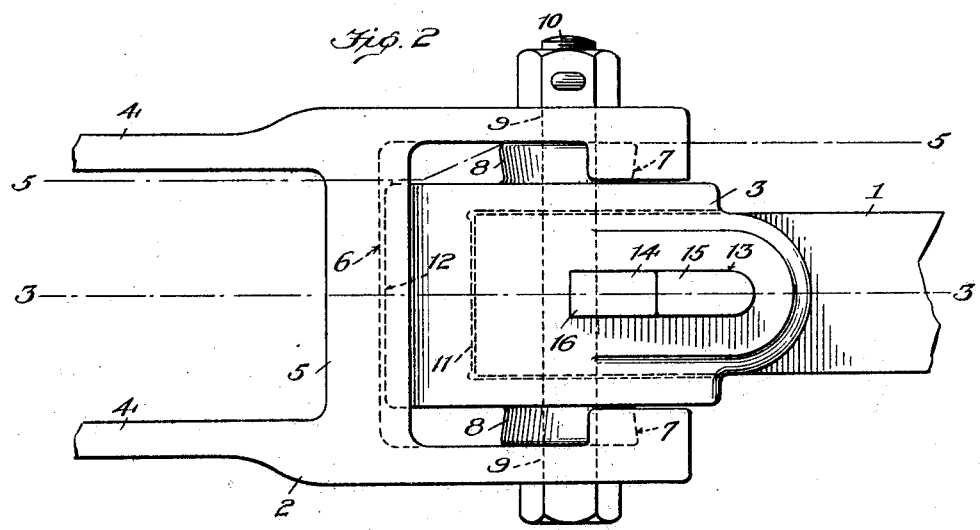
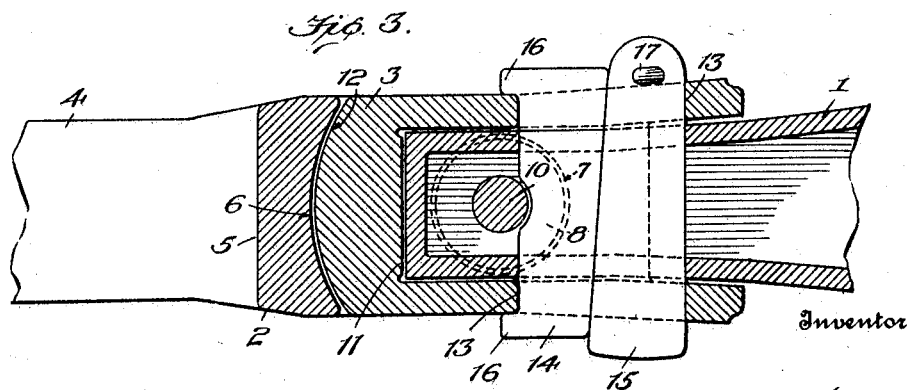
Witness
Edwin L. Bradford
Inventor
William Kelso
By Ritter & Ritter
Attorneys

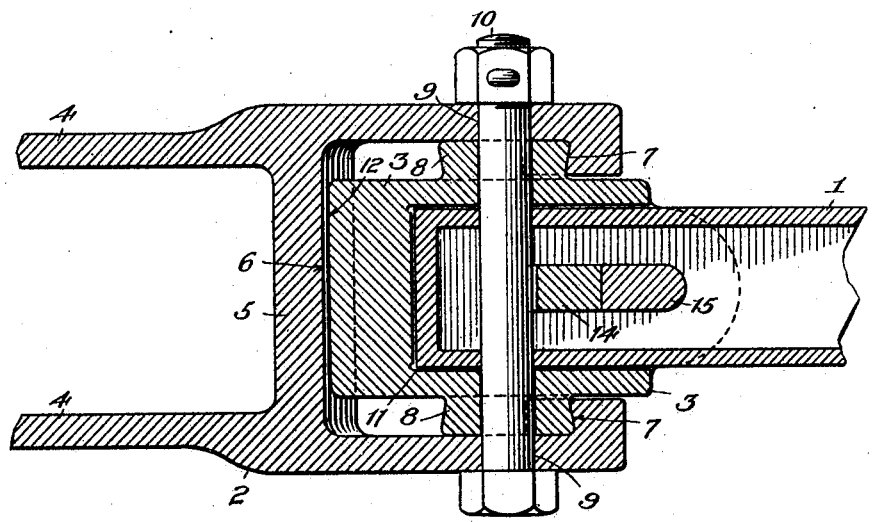
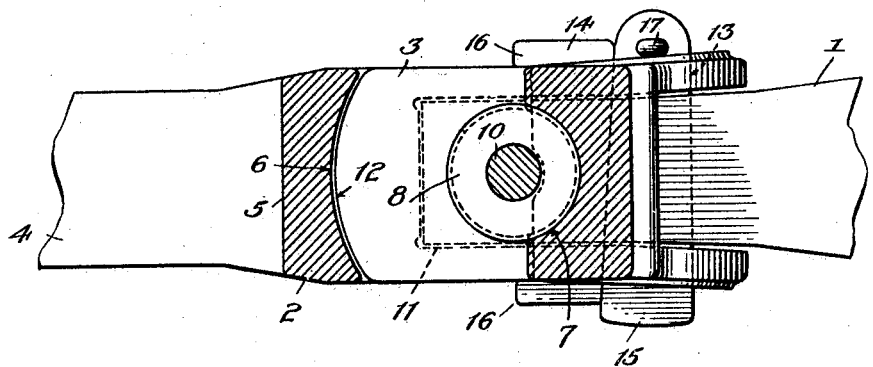

UNITED STATES PATENT OFFICE.

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

COUPLING AND YOKE CONNECTION.

1,399,563.          Specification of Letters Patent.          Patented Dec. 6, 1921.

Application filed June 4, 1920. Serial No. 386,532.

*To all whom it may concern:*

Be it known that I, WILLIAM KELSO, a citizen of the United States, residing at Pittsburgh, in the county of Allegheny and State of Pennsylvania, have invented certain new and useful Improvements in Coupling and Yoke Connections; and I do hereby declare the following to be a full, clear, and exact description of the invention, such as will enable others skilled in the art to which it appertains to make and use the same.

My invention relates to a coupler and yoke connection for the draft rigging of railway cars, and is especially designed to render couplers of the type with which freight cars are equipped available for application to passenger cars. As is well known, the car couplers in use upon freight cars are commonly applied to the yoke of the draft rigging so as to be either rigidly connected thereto or capable of longitudinal sliding movement only. Upon passenger cars it is customary to pivotally attach the coupler to the yoke so that the coupler may swing to either side of its normal position as may be required when the car passes around a curve. My invention enables couplers which are not primarily designed for that purpose to be pivotally attached to the draft yoke in a simple and efficient manner enabling them to execute the desired swinging movements.

The principal objects of the invention are accomplished by attaching the stem of the car coupler to the yoke through the intervention of an intermediate member which is provided at its rear end with a curved face adapted to coöperate with a correspondingly curved transversely extending portion of the yoke and which also has in advance of and concentric with said curved rear face a plurality of oppositely disposed curved shoulders or trunnions of less radii of curvature, the yoke being provided at its forward end with oppositely disposed concavely curved bearing faces corresponding to those of the trunnions and separated from the curved face of the yoke which coöperates with the rear end of the intermediate member by a side opening in the yoke through which the trunnions and rear end of the intermediate member are adapted to be entered in assembling the mechanism, the intermediate member being provided with key slots adapted to receive key means extending through a slot in the coupler stem near the rear end thereof.

In the drawings illustrating the best mode in which I contemplate applying the principle of my invention,—

Figure 1 is a plan view of a coupler and yoke connection embodying the invention, the rear end of the draft yoke and the forward portion of the car coupler being broken away.

Fig. 2 is a side elevation of the device.

Fig. 3 is a section on the line 3—3, Fig. 2, the key means for attaching the coupler to the intermediate member being shown in plan.

Fig. 4 is a section on the line 4—4, Fig. 1.

Fig. 5 is a section on the line 5—5, Fig. 2.

In the drawings, 1 is the stem of the car coupler, 2 is the draft yoke, and 3 is the intermediate member through which the coupler is pivotally connected to the yoke.

The yoke 2 is shown as provided with the usual parallel arms 4 which are adapted to receive a cushioning unit (not shown) between them. The arms 4 are integrally united at their forward ends by a transversely extending tie bar 5 the inner face of which is adapted to engage the forward end of the cushioning unit to impart buffing strains thereto and the outer or forward face 6 of which is cylindrically curved. In advance of the transversely extending bar 5 the yoke is provided with oppositely disposed circularly curved bearing faces 7 which, as shown, are preferably undercut or of conical form. The concavely curved bearing faces 7 are concentric with the forwardly facing concavely curved face 6, but their radii of curvature are smaller than that of the surface 6 in order that comparatively deep bearing sockets may be formed for the reception of the correspondingly curved and undercut trunnions 8 borne by the intermediate member 3. The sides of the yoke 2 are open in advance of the transversely extending bar 5 and the curved bearing face 6 is spaced rearwardly from the oppositely disposed bearing faces 7 at the forward end of the yoke a distance allowing the assembly and disassembly of the intermediate member 3 with relation to the draft yoke when said intermediate member has been rotated horizontally to a position at right angles to that which it normally occupied. In the axis of curvature of the curved faces 6 and 7 the yoke 2 is preferably provided with alined pivot pin openings 9 which receive a bolt 10 that passes through the centers of the trunnions 8 as well as through the rear end of the stem 1 of the coupler.

The intermediate member 3 is formed with a forwardly opening recess or socket 11 of angular cross section corresponding to that of the coupler stem 1, said socket preferably extending inwardly a sufficient distance to allow the rear end of the coupler stem to extend beyond the oppositely located curved bearing faces 7 of the yoke 2, thus affording a comparatively long bearing for the coupler stem within the intermediate member 3. The rear end of the intermediate member 3, which is preferably an integral casting, is convexly curved cylindrically, as at 12, concentric with the trunnions 8 to correspond to the curvature of the adjacent cooperating face 6 of the draft yoke; and near its forward end the side walls of the intermediate member are provided with transversely alined slots 13 which are adapted to receive the key means by which the coupler stem 1 and intermediate member 3 are connected. The key means preferably employed for this purpose consist of two cooperating wedge elements 14 and 15, respectively. The inner edge of the key member 14 is recessed at its center to afford clearance for the pivot bolt 10 which latter thus serves to maintain the member 14 in assembled position; but for this latter purpose it is also preferred to form the member 14 at its outer ends with rearwardly extending lugs 16 which are adapted to overlap the sides of the intermediate member 3 when the parts are in assembled position. The complemental wedge key 15 may be retained in position by employing a single cotter 17 which is passed through the narrow end of the wedge 15 after the latter is in place.

In assembling the device the intermediate member 3 is turned horizontally until it stands at right angles to its normal position, when its rear end may be inserted between the oppositely disposed curved bearing faces 7 and the forwardly facing concave surface 6 of the yoke. The trunnions 8 may then be advanced until they properly engage the curved bearing faces 7, after which the intermediate member is rotated until its curved rear end stands in front of the correspondingly curved face 6 of the yoke. The stem 1 of the car coupler is then inserted in the socket 11 of the intermediate member, and the wedges 14 and 15 constituting the key means are put in place. The pivot bolt 10 then may be inserted through the openings provided therefor in the yoke, in the intermediate member, and in the coupler stem. While the rearward extension of the intermediate member 3 by coöperating with the forward face 6 of the transverse bar 5 of the yoke serves to maintain the trunnions 8 in proper relation to the curved bearing faces 7 of the yoke, it is preferred to employ the bolt 10 for a similar purpose and also to assist the undercut trunnions 8 in preventing any spreading or separation of the oppositely disposed bearing faces 7 at the forward end of the yoke. The car coupler may be removed for the purpose of replacing it in case it is damaged by merely withdrawing the wedge keys 14 and 15.

I claim:—

1. In a coupler and yoke connection, the combination with a coupler having a stem provided with a key slot near its rear end, of a yoke provided at its forward end with oppositely disposed rearwardly facing curved bearing faces and having a forwardly facing curved face located rearwardly of said oppositely disposed curved faces and also having a side opening between said forwardly facing curved face and said rearwardly facing curved bearing faces, an intermediate member between said coupler and yoke and pivotally connected to the latter, and key means extending into said slot of the coupler stem for connecting said coupler and said intermediate member, said intermediate member being provided with oppositely disposed trunnions respectively engaging said rearwardly facing curved bearing faces of the yoke and being curved at its rear end to coöperate with said forwardly facing curved face of said yoke.

2. In a coupler and yoke connection, the combination with a coupler having a stem, of a yoke provided at its forward end with oppositely disposed rearwardly facing concavely curved bearing faces and having a forwardly facing concavely curved face spaced rearwardly from and concentric with said rearwardly facing bearing faces and also having a side opening located between said forwardly facing curved face and said rearwardly facing curved faces, the radii of curvature of said rearwardly facing curved faces being less than that of said forwardly facing curved face, an intermediate member between said coupler and yoke, and means for connecting said coupler stem and intermediate member, said intermediate member being provided in advance of its rear end with oppositely disposed trunnions having convexly curved faces corresponding to and adapted to engage said rearwardly facing curved bearing faces.

3. In a coupler and yoke connection, the combination with a coupler having a stem, of a yoke provided at its forward end with oppositely disposed concavely curved bearing faces and having a concavely curved face spaced rearwardly from and concentric with said oppositely disposed curved bearing faces, said yoke having a side opening located between said oppositely disposed bearing faces and the said curved face spaced rearwardly therefrom, an intermediate member interposed between said coupler and yoke, and a key for connecting said coupler stem and said intermediate member, said inintermediate member being provided forwardly of its rear end with oppositely disposed curved shoulders corresponding to and respectively adapted to engage said oppositely disposed curved bearing faces of the yoke.

4. In a coupler and yoke connection, the combination with a coupler having a stem, of a yoke provided at its forward end with oppositely disposed concavely curved bearing faces and having a transversely extending portion adapted to engage the front end of a cushioning unit, an intermediate member between said coupler and yoke, said intermediate member having a curved rear face adapted to coöperate with the said transversely extending portion of the yoke and having oppositely disposed curved shoulders in advance of and concentric with said curved rear face and corresponding to and respectively adapted to engage said oppositely disposed curved bearing faces of the yoke, and a pin extending through said coupler stem, intermediate member and yoke in the axis of curvature of said curved faces.

5. In a coupler and yoke connection, the combination with a coupler having a stem provided with a slot and with a pivot pin hole rearwardly of said slot and extending at an angle with respect thereto, of a yoke, a member intermediate of said yoke and coupler, key means extending through said slot in the coupler stem for connecting said coupler to said intermediate member, and a pivot pin extending through said pivot pin hole in the coupler stem and through said intermediate member and yoke.

6. In a coupler and yoke connection, the combination with a coupler having a stem provided with a slot and with a pivot pin hole rearwardly of said slot and extending at an angle thereto, of a yoke, a member intermediate of said yoke and coupler, a pivot pin extending through said pivot pin hole of the coupler stem and through said intermediate member and yoke, and key means extending through said slot for connecting said coupler to said intermediate member, said key means having a recess adapted to receive said pivot pin.

In testimony whereof I affix my signature.

WILLIAM KELSO.